(12) United States Patent
Gong et al.

(10) Patent No.: US 10,205,806 B2
(45) Date of Patent: Feb. 12, 2019

(54) METHOD AND APPARATUS FOR CONFIGURING REDUNDANCY SOLUTION IN CLOUD COMPUTING ARCHITECTURE

(71) Applicant: Huawei Technologies Co., Ltd., Shenzhen, Guangdong (CN)

(72) Inventors: Xiaodong Gong, Shanghai (CN); Jie Yin, Shanghai (CN); Miaohua Li, Dongguan (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 212 days.

(21) Appl. No.: 15/292,550

(22) Filed: Oct. 13, 2016

(65) Prior Publication Data

US 2017/0034318 A1 Feb. 2, 2017

Related U.S. Application Data

(63) Continuation of application No. PCT/CN2014/075321, filed on Apr. 14, 2014.

(51) Int. Cl.
*G06F 15/173* (2006.01)
*H04L 29/14* (2006.01)
(Continued)

(52) U.S. Cl.
CPC .......... *H04L 69/40* (2013.01); *H04L 41/0668* (2013.01); *H04L 67/10* (2013.01); *H04L 41/0836* (2013.01)

(58) Field of Classification Search
CPC ..... H04L 69/40; H04L 67/10; H04L 41/0668; H04L 41/0836
(Continued)

(56) References Cited

U.S. PATENT DOCUMENTS

| 5,157,663 A | * | 10/1992 | Major ................. G06F 11/1482 714/10 |
| 2013/0019124 A1 | * | 1/2013 | Grimshaw .......... G06F 11/2015 714/24 |

(Continued)

FOREIGN PATENT DOCUMENTS

| CN | 101437175 A | 5/2009 |
| CN | 101557307 A | 10/2009 |

(Continued)

OTHER PUBLICATIONS

European Patent Application No. 14889327.4, Extended European Search Report, dated Feb. 24, 2017, 8 pages.

(Continued)

*Primary Examiner* — Liang Che A Wang
(74) *Attorney, Agent, or Firm* — Wonble Bond Dickinson (US) LLP (57) ABSTRACT

The present invention relates to the field of communications and information technologies, and in particular, to a method and an apparatus for configuring a redundancy solution in a cloud computing architecture, so as to solve a problem that a manner of manually planning a redundancy solution has poor flexibility and is unfavorable to overall management of a system. The method in the present invention includes: receiving a redundancy solution configuration request; determining, according to the redundancy solution configuration request, redundancy capability information and redundancy constraint requirement information of an application object to be configured; and determining, according to infrastructure information, infrastructure manager information, and application object information in an established redundancy capability information base, and the redundancy capability information and the redundancy constraint (Continued)

requirement information of the application object to be configured.

12 Claims, 6 Drawing Sheets

(51) Int. Cl.
  *H04L 29/08* (2006.01)
  *H04L 12/24* (2006.01)
(58) Field of Classification Search
  USPC .................... 709/217, 218, 219, 223, 224
  See application file for complete search history.

(56) References Cited

U.S. PATENT DOCUMENTS

2013/0212285 A1    8/2013  Hoffman et al.
2016/0335111 A1*  11/2016  Bruun .................. G06F 9/45558

FOREIGN PATENT DOCUMENTS

| | | |
|---|---|---|
| CN | 101656624 A | 2/2010 |
| CN | 102025776 A | 4/2011 |
| CN | 102123048 A | 7/2011 |
| CN | 102609309 A | 7/2012 |
| CN | 102629224 A | 8/2012 |
| CN | 202488495 U | 10/2012 |
| CN | 102868549 A | 1/2013 |
| CN | 103530698 A | 1/2014 |
| EP | 2222099 B1 | 6/2012 |
| RU | 2108621 C1 | 4/1998 |

OTHER PUBLICATIONS

ETSI, "Network Functions Virtualisation ISG; SW Architecure: Virtual Network Functions Architecture," GS NFV-SWA 001 V0.0.16 (Mar. 2014), Server Date Mar. 18, 2014, 98 pages.
ETSI, "Network Functions Virtualisation (NFV); Use Cases," ETSI GS NFV 001 V1.1.1.1 (Oct. 2013), Oct. 2013, 50 pages.

* cited by examiner

METHOD AND APPARATUS FOR CONFIGURING REDUNDANCY SOLUTION IN CLOUD COMPUTING ARCHITECTURE

CROSS-REFERENCE TO RELATED APPLICATIONS

This application is a continuation of International Application No. PCT/CN2014/075321, filed on Apr. 14, 2014, the disclosure of which is hereby incorporated by reference in its entirety.

TECHNICAL FIELD

The present invention relates to the field of communications and information technologies, and in particular, to a method and an apparatus for configuring a redundancy solution in a cloud computing architecture.

BACKGROUND

In a redundancy solution, two sets or multiple sets of systems with similar functions are established in different places far from each other. A redundancy technology is a reliability mechanism that maintains a capability of providing an application service by switching a working system to a redundancy system in a different place when a disaster such as an earthquake or a fire occurs or a critical failure such as power-off occurs on the working system.

Cloud computing is a service model in which computing work is distributed across a large number of distributed computers. In this model, there is a configurable computing resources sharing pool (including a network, a server, a storage device, application software, a service, and the like), which may provide available, convenient, and on-demand network access for a user. The cloud computing is a development result of integrating computing methods such as distributed computing, parallel computing, and utility computing with network technologies such as network storage, virtualization, and load balance.

Figure 1:
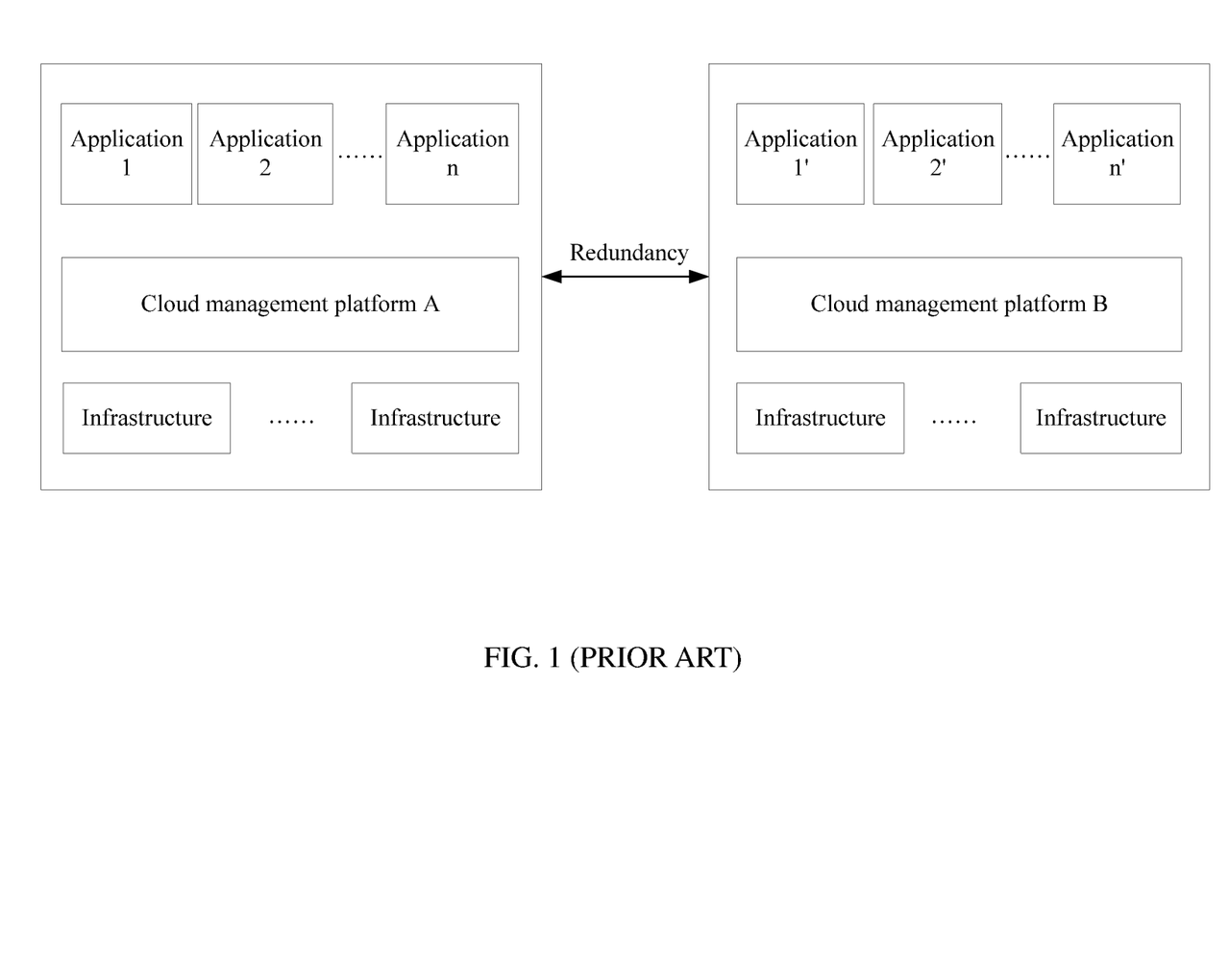
FIG. 1 is a schematic diagram of redundancy deployment in the IT field.

As shown in FIG. 1, in a cloud computing architecture in the field of information technology (IT), a data center (DC) is generally used as a unit in a process of deploying each application object; multiple infrastructures and multiple application objects are deployed in one DC site, and DCs that have a redundancy relationship generally use cloud management platforms provided by a same device vendor. The DC herein may refer to a physical DC or a virtual DC.

When a new application object is deployed, a user first plans a corresponding redundancy solution according to a redundancy capability provided by a cloud computing system, and then instructs the cloud computing system to implement the redundancy solution planned by the user. This manner of manually planning a redundancy solution has poor flexibility, which is unfavorable to overall management of a system.

SUMMARY

Embodiments of the present invention provide a method and an apparatus for configuring a redundancy solution in a cloud computing architecture, so as to solve a problem that a manner of manually planning a redundancy solution has poor flexibility and is unfavorable to overall management of a system.

According to a first aspect, an apparatus for configuring a redundancy solution in a cloud computing architecture is provided, including:

a receiving module, configured to receive a redundancy solution configuration request, and transmit the received redundancy solution configuration request to a first determining module;

the first determining module, configured to determine, according to the redundancy solution configuration request, redundancy capability information and redundancy constraint requirement information of an application object to be configured; and transmit the determined redundancy capability information and the redundancy constraint requirement information of the application object to be configured to a second determining module; and the second determining module, configured to determine, according to infrastructure information, infrastructure manager information, and application object information in an established redundancy capability information base, and the redundancy capability information and the redundancy constraint requirement information of the application object to be configured, a redundancy solution for the application object to be configured.

With reference to the first aspect, in a first possible implementation manner, the infrastructure information includes redundancy capability information and/or resource usage information of at least one infrastructure;

the infrastructure manager information includes redundancy capability information of at least one infrastructure manager; and the application object information includes redundancy capability information, and/or redundancy constraint information, and/or health status information of at least one application object that has been deployed.

With reference to the first possible implementation manner of the first aspect, in a second possible implementation manner, the cloud computing architecture is a network functions virtualization (NFV) architecture; the application object is a virtualized network function (VNF); the infrastructure is a network functions virtualization infrastructure (NFVI); and the infrastructure manager is a virtual infrastructure manager (VIM).

With reference to the second possible implementation manner of the first aspect, in a third possible implementation manner, the redundancy capability information base and the apparatus are located in a network functions virtualization orchestrator (NFVO), or the redundancy capability information base and the apparatus are located in a virtualized network function manager (VNFM); and the receiving module is further configured to receive information, transmitted by any infrastructure manager, of the infrastructure manager and each infrastructure managed by the infrastructure manager, and store, in the redundancy capability information base, the received information of the infrastructure manager and each infrastructure managed by the infrastructure manager.

With reference to the third possible implementation manner of the first aspect, in a fourth possible implementation manner, the redundancy capability information base and the apparatus are located in the NFVO;

the receiving module is specifically configured to receive the redundancy solution configuration request transmitted by an operation support system (OSS) or a business support system (BSS), or receive the redundancy solution configuration request that is from an element management system (EMS) and forwarded by the virtualized network function manager (VNFM), or receive the redundancy solution configuration request sent by the VNFM, or receive the redundancy solution configuration request delivered by NFVO management software; and the receiving module is further configured to receive information, transmitted by the VNFM, of each application object managed by the VNFM, and store the received information of each application object in the redundancy capability information base.

With reference to the third possible implementation manner of the first aspect, in a fifth possible implementation manner, the redundancy capability information base and the apparatus are located in the VNFM;

the receiving module is specifically configured to receive the redundancy solution configuration request transmitted by an EMS, or receive the redundancy solution configuration request that is from an OSS or a BSS and forwarded by the NFVO, or receive the redundancy solution configuration request transmitted by the NFVO, or receive the redundancy solution configuration request delivered by VNFM management software; and the receiving module is further configured to receive application object information transmitted by each application object, and store the received application object information in the redundancy capability information base.

According to a second aspect, an apparatus for configuring a redundancy solution in a cloud computing architecture is provided, including a processor and a memory, where the memory stores an execution instruction; when the apparatus runs, the processor communicates with the memory, and the processor executes the execution instruction, so that the apparatus implements the following method:

receiving a redundancy solution configuration request;

determining, according to the redundancy solution configuration request, redundancy capability information and redundancy constraint requirement information of an application object to be configured; and determining, according to infrastructure information, infrastructure manager information, and application object information in an established redundancy capability information base, and the redundancy capability information and the redundancy constraint requirement information of the application object to be configured, a redundancy solution for the application object to be configured.

With reference to the second aspect, in a first possible implementation manner, the infrastructure information includes redundancy capability information and/or resource usage information of at least one infrastructure;

the infrastructure manager information includes redundancy capability information of at least one infrastructure manager; and the application object information includes redundancy capability information, and/or redundancy constraint information, and/or health status information of at least one application object that has been deployed.

With reference to the first possible implementation manner of the second aspect, in a second possible implementation manner, the cloud computing architecture is a network functions virtualization (NFV architecture); the application object is a virtualized network function (VNF); the infrastructure is a network functions virtualization infrastructure (NFVI); and the infrastructure manager is a virtual infrastructure manager (VIM).

With reference to the second possible implementation manner of the second aspect, in a third possible implementation manner, the redundancy capability information base is located in a network functions virtualization orchestrator (NFVO) or located in a virtualized network function manager (VNFM); where in the method implemented by the processor, the infrastructure information and the infrastructure manager information are collected into the established redundancy capability information base according to the following steps: receiving information, transmitted by any infrastructure manager, of the infrastructure manager and each infrastructure managed by the infrastructure manager; and storing, in the redundancy capability information base, the received information of the infrastructure manager and each infrastructure managed by the infrastructure manager.

With reference to the third possible implementation manner of the second aspect, in a fourth possible implementation manner, the redundancy capability information base is located in the NFVO;

in the method implemented by the processor, the receiving a redundancy solution configuration request includes: receiving the redundancy solution configuration request transmitted by an operation support system (OSS) or a business support system (BSS), or receiving the redundancy solution configuration request that is from an element management system (EMS) and forwarded by the virtualized network function manager (VNFM), or receiving the redundancy solution configuration request sent by the VNFM, or receiving the redundancy solution configuration request delivered by NFVO management software; and the application object information is collected into the established redundancy capability information base according to the following steps: receiving information, transmitted by the VNFM, of each application object managed by the VNFM; and storing the received information of each application object in the redundancy capability information base.

With reference to the third possible implementation manner of the second aspect, in a fifth possible implementation manner, the redundancy capability information base is located in the VNFM;

in the method implemented by the processor, the receiving a redundancy solution configuration request includes: receiving the redundancy solution configuration request transmitted by an EMS, or receiving the redundancy solution configuration request that is from an OSS or a BSS and forwarded by the NFVO, or receiving the redundancy solution configuration request transmitted by the NFVO, or receiving the redundancy solution configuration request delivered by VNFM management software; and the application object information is collected into the established redundancy capability information base according to the following steps: receiving application object information transmitted by each application object; and storing the received application object information in the redundancy capability information base.

According to a third aspect, a method for configuring a redundancy solution in a cloud computing architecture is provided, including:

receiving a redundancy solution configuration request;

determining, according to the redundancy solution configuration request, redundancy capability information and redundancy constraint requirement information of an application object to be configured; and determining, according to infrastructure information, infrastructure manager information, and application object information in an established redundancy capability information base, and the redundancy capability information and the redundancy constraint requirement information of the application object to be configured, a redundancy solution for the application object to be configured.

With reference to the third aspect, in a first possible implementation manner, the infrastructure information includes redundancy capability information and/or resource usage information of at least one infrastructure;

the infrastructure manager information includes redundancy capability information of at least one infrastructure manager; and the application object information includes redundancy capability information, and/or redundancy constraint information, and/or health status information of at least one application object that has been deployed.

With reference to the first possible implementation manner of the third aspect, in a second possible implementation manner, the cloud computing architecture is a network functions virtualization (NFV) architecture; the application object is a virtualized network function (VNF); the infrastructure is a network functions virtualization infrastructure (NFVI); and the infrastructure manager is a virtual infrastructure manager (VIM).

With reference to the second possible implementation manner of the third aspect, in a third possible implementation manner, the redundancy capability information base is located in a network functions virtualization orchestrator (NFVO) or located in a virtualized network function manager (VNFM); where the infrastructure information and the infrastructure manager information are collected into the established redundancy capability information base according to the following steps: receiving information, transmitted by any infrastructure manager, of the infrastructure manager and each infrastructure managed by the infrastructure manager; and storing, in the redundancy capability information base, the received information of the infrastructure manager and each infrastructure managed by the infrastructure manager.

With reference to the third possible implementation manner of the third aspect, in a fourth possible implementation manner, the redundancy capability information base is located in the NFVO; where the receiving a redundancy solution configuration request includes: receiving the redundancy solution configuration request transmitted by an operation support system (OSS) or a business support system (BSS), or receiving the redundancy solution configuration request that is from an element management system (EMS) and forwarded by the virtualized network function manager (VNFM), or receiving the redundancy solution configuration request sent by the VNFM, or receiving the redundancy solution configuration request delivered by NFVO management software; and the application object information is collected into the established redundancy capability information base according to the following steps: receiving information, transmitted by the VNFM, of each application object managed by the VNFM; and storing the received information of each application object in the redundancy capability information base.

With reference to the third possible implementation manner of the third aspect, in a fifth possible implementation manner, the redundancy capability information base is located in the VNFM; where the receiving a redundancy solution configuration request includes: receiving the redundancy solution configuration request transmitted by an EMS, or receiving the redundancy solution configuration request that is from an OSS or a BSS and forwarded by the NFVO, or receiving the redundancy solution configuration request transmitted by the NFVO, or receiving the redundancy solution configuration request delivered by VNFM management software; and the application object information is collected into the established redundancy capability information base according to the following steps: receiving application object information transmitted by each application object; and storing the received application object information in the redundancy capability information base.

In the foregoing method, a redundancy capability information base is used to collect information of each infrastructure, each infrastructure manager, and each application object, and a redundancy solution may be automatically selected for a user according to an actual requirement of the user, which has higher flexibility and facilitates overall management of a system.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The following further describes the embodiments of the present invention in detail with reference to accompanying drawings.

Embodiments of the present invention are applied to configuration of a redundancy solution for an application object in a cloud computing architecture, and the application object herein refers to a network element application in the cloud computing architecture, for example, a third-party application and various virtual network elements such as a base station, a controller, a mobility management entity (MME), a serving gateway (SGW), and a packet data network gateway (PGW). The embodiments of the present invention may be applied to a cloud computing architecture based on a traditional information technology (IT), and may also be applied to a network functions virtualization (NFV)

cloud computing architecture based on an emerging information and communication technology (ICT).

In the embodiments of the present invention, a redundancy capability information base is used to collect information of each infrastructure, each infrastructure manager, and each application object, and a redundancy solution may be automatically selected for a user according to an actual requirement of the user, which has higher flexibility and facilitates overall management of a system.

The following embodiments of the present invention first introduce implementation of an apparatus for configuring a redundancy solution in a cloud computing architecture. The implementation of the apparatus is similar to subsequently introduced implementation of a method for configuring a redundancy solution in a cloud computing architecture, and repeated information is not provided again herein.

Figure 2:
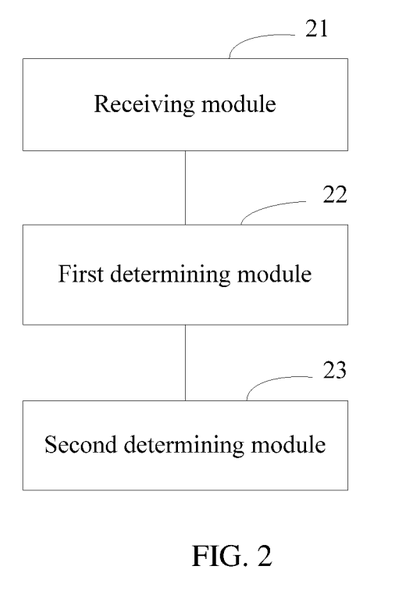
FIG. 2 is a schematic structural diagram of an apparatus for configuring a redundancy solution in a cloud computing architecture according to Embodiment 1 of the present invention.

FIG. 2 shows a schematic structural diagram of an apparatus for configuring a redundancy solution in a cloud computing architecture according to Embodiment of the present invention, and the apparatus includes:

a receiving module 21, configured to receive a redundancy solution configuration request, and transmit the received redundancy solution configuration request to a first determining module 22;

the first determining module 22, configured to determine, according to the redundancy solution configuration request, redundancy capability information and redundancy constraint requirement information of an application object to be configured; and transmit the determined redundancy capability information and the redundancy constraint requirement information of the application object to be configured to a second determining module 23; and the second determining module 23, configured to determine, according to infrastructure information, infrastructure manager information, and application object information in an established redundancy capability information base, and the redundancy capability information and the redundancy constraint requirement information of the application object to be configured, a redundancy solution for the application object to be configured.

Optionally, the infrastructure information includes redundancy capability information and/or resource usage information of at least one infrastructure;

the infrastructure manager information includes redundancy capability information of at least one infrastructure manager; and the application object information includes redundancy capability information, and/or redundancy constraint information, and/or health status information of at least one application object that has been deployed.

Optionally, the cloud computing architecture is a network functions virtualization (NFV) architecture; the application object is a virtualized network function (VNF); the infrastructure is a network functions virtualization infrastructure (NFVI); and the infrastructure manager is a virtual infrastructure manager (VIM).

Optionally, the redundancy capability information base and the apparatus are located in a NFVO, or the redundancy capability information base and the apparatus are located in a virtualized network function manager (VNFM); where the receiving module 21 is further configured to receive information, transmitted by any infrastructure manager, of the infrastructure manager and each infrastructure managed by the infrastructure manager, and store, in the redundancy capability information base, the received information of the infrastructure manager and each infrastructure managed by the infrastructure manager.

Optionally, the redundancy capability information base and the apparatus are located in a NFVO; where the receiving module 21 is specifically configured to receive the redundancy solution configuration request transmitted by an operation support system (OSS) or a business support system (BSS), or receive the redundancy solution configuration request that is from an element management system (EMS) and forwarded by a virtualized network function manager (VNFM), or receive the redundancy solution configuration request sent by the VNFM, or receive the redundancy solution configuration request delivered by NFVO management software; and the receiving module 21 is further configured to receive information, transmitted by the VNFM, of each application object managed by the VNFM, and store the received information of each application object in the redundancy capability information base.

Optionally, the redundancy capability information base and the apparatus are located in a VNFM; where the receiving module 21 is specifically configured to receive the redundancy solution configuration request transmitted by an EMS, or receive the redundancy solution configuration request that is from an OSS or a BSS and forwarded by a NFVO, or receive the redundancy solution configuration request transmitted by the NFVO, or receive the redundancy solution configuration request delivered by VNFM management software; and the receiving module 21 is further configured to receive application object information transmitted by each application object, and store the received application object information in the redundancy capability information base.

Figure 3:
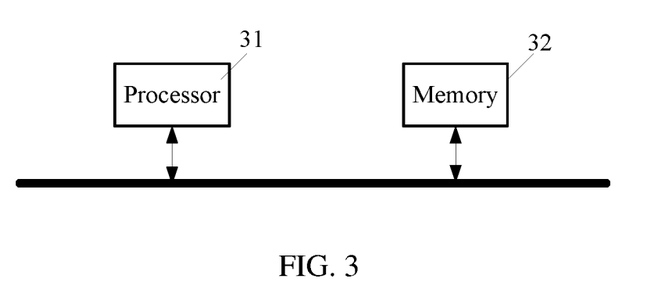
FIG. 3 is a schematic structural diagram of an apparatus for configuring a redundancy solution in a cloud computing architecture according to Embodiment 2 of the present invention.

FIG. 3 shows a schematic structural diagram of an apparatus for configuring a redundancy solution in a cloud computing architecture according to Embodiment of the present invention, and the apparatus includes a processor 31 and a memory 32, where the memory 32 stores an execution instruction; when the apparatus runs, the processor 31 communicates with the memory 32, and the processor 31 executes the execution instruction, so that the apparatus implements the following method:

receiving a redundancy solution configuration request;

determining, according to the redundancy solution configuration request, redundancy capability information and redundancy constraint requirement information of an application object to be configured; and determining, according to infrastructure information, infrastructure manager information, and application object information in an established redundancy capability information base, and the redundancy capability information and the redundancy constraint requirement information of the application object to be configured, a redundancy solution for the application object to be configured.

Optionally, the infrastructure information includes redundancy capability information and/or resource usage information of at least one infrastructure;

the infrastructure manager information includes redundancy capability information of at least one infrastructure manager; and the application object information includes redundancy capability information, and/or redundancy constraint information, and/or health status information of at least one application object that has been deployed.

Optionally, the cloud computing architecture is a network functions virtualization NFV architecture; the application object is a VNF; the infrastructure is a network functions virtualization infrastructure NFVI; and the infrastructure manager is a virtual infrastructure manager VIM.

Optionally, the redundancy capability information base is located in a network functions virtualization management platform NFVO or located in a virtualized network function manager VNFM; where in the method implemented by the processor 31, the infrastructure information and the infrastructure manager information are collected into the established redundancy capability information base according to the following steps: receiving information, transmitted by any infrastructure manager, of the infrastructure manager and each infrastructure managed by the infrastructure manager; and storing, in the redundancy capability information base, the received information of the infrastructure manager and each infrastructure managed by the infrastructure manager.

Optionally, the redundancy capability information base is located in a network functions virtualization management platform NFVO; where in the method implemented by the processor 31, the receiving a redundancy solution configuration request includes: receiving the redundancy solution configuration request transmitted by an operation support system OSS or a business support system BSS, or receiving the redundancy solution configuration request that is from an element management system EMS and forwarded by a virtualized network function manager VNFM, or receiving the redundancy solution configuration request sent by the virtualized network function manager VNFM, or receiving the redundancy solution configuration request delivered by NFVO management software; and the application object information is collected into the established redundancy capability information base according to the following steps: receiving information, transmitted by the virtualized network function manager VNFM, of each application object managed by the VNFM; and storing the received information of each application object in the redundancy capability information base.

Optionally, the redundancy capability information base is located in a virtualized network function manager VNFM; where in the method implemented by the processor 31, the receiving a redundancy solution configuration request includes: receiving the redundancy solution configuration request transmitted by an element management system EMS, or receiving the redundancy solution configuration request that is from an operation support system OSS or a business support system BSS and forwarded by a network functions virtualization management platform NFVO, or receiving the redundancy solution configuration request transmitted by the NFVO, or receiving the redundancy solution configuration request delivered by VNFM management software; and the application object information is collected into the established redundancy capability information base according to the following steps: receiving application object information transmitted by each application object; and storing the received application object information in the redundancy capability information base.

Figure 4:
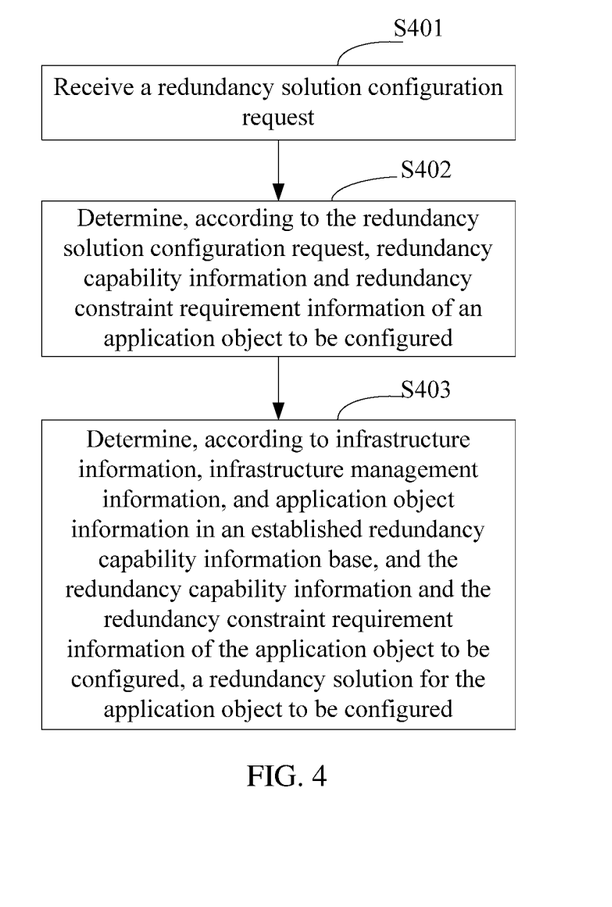
FIG. 4 is a flowchart of a method for configuring a redundancy solution in a cloud computing architecture according to Embodiment 3 of the present invention.

FIG. 4 shows a flowchart of a method for configuring a redundancy solution in a cloud computing architecture according to Embodiment of the present invention, and the method includes the following steps:

S401. Receive a redundancy solution configuration request.

In a specific implementation process, an execution subject in this embodiment of the present invention may be deployed as a redundancy solution preference module in a function object of an existing cloud computing architecture (for example, deployed in a network functions virtualization management platform NFVO or a virtualized network function manager VNFM in an NFV architecture), and may also be deployed as an independent function object in the existing cloud computing architecture.

The redundancy solution configuration request in step S401 may include identification information (such as a name of an application object) of at least one application object for which a redundancy solution needs to be configured. The redundancy solution configuration request may not only be used to request configuration of a redundancy solution for one application object, but also to request configuration of a redundancy solution for a network service (NS) supported by multiple application objects, and may further to request configuration of a redundancy solution for a DC including multiple application objects, where the NS herein may be considered as a function or a service item that is completed by multiple application objects. In addition, the redundancy solution configuration request may further include redundancy capability information and redundancy constraint requirement information of at least one application object, or network service NS, or DC.

The foregoing redundancy capability refers to a capability of providing a redundancy technology, and includes information of elements such as a redundancy mechanism, a redundancy mode, and a redundancy specification. The redundancy mechanism may be a mechanism that performs redundancy and backup based on an infrastructure layer, a mechanism that performs redundancy and backup based on an application layer, a mechanism that performs redundancy and backup based on a platform layer, or a mechanism that performs redundancy and backup based on a management domain. The redundancy mode may be an active-standby mode, an active-active mode, a load sharing mode, or an active/to-deployed mode, where the active-standby mode refers to a mode in which an active working system is in a working state, and a standby working system enters a working state when the active working system becomes faulty; the active-active mode refers to a mode in which multiple working systems work simultaneously; the load sharing mode refers to a mode in which multiple working systems share load and run simultaneously; and the active/to-deployed mode refers to that data information of only a working system to be used is saved, and when an active working system becomes faulty, a working system is generated according to the saved data information and enters a working state. The redundancy specification may include a redundancy level, a recovery point objective (RPO), a recovery time objective (RTO), a maximum number of supported redundancy virtual machines (VM), and the like.

The foregoing redundancy constraint refers to some deployment conditions defined according to an actual feature of an application object and a refined requirement of a user, and includes a geographical constraint, a compatibility constraint, an anti-compatibility constraint, a priority constraint, and the like. The geographical constraint refers to that an application object cannot be deployed in a specified country, region, DC, or the like, or an application object can be deployed only in a specified country, region, DC, or the like. The compatibility constraint refers to that multiple application objects (for example, different application objects in a same network service (NS)) that have close service coupling or geographical proximity are deployed in a same DC, or a same infrastructure manager is deployed for multiple application objects that have close service coupling, or the like. The anti-compatibility constraint refers to that multiple application objects need to be deployed in different DCs, or different infrastructure managers are deployed for multiple application objects, for example, several application objects in a load sharing redundancy mode are deployed in different DCs. The priority constraint refers to that in different resource states or in a situation in which an abnormal event occurs, application objects with different priorities may be provided with differentiated services, for example, when resources such as infrastructures are insufficient, it is ensured that redundancy can be implemented in precedence for an application object with a high priority.

S402. Determine, according to the redundancy solution configuration request, redundancy capability information and redundancy constraint requirement information of an application object to be configured.

The application object to be configured herein refers to an application object for which a redundancy solution needs to be configured, where the application object may be an application object that has been deployed (that is, an application object that has been deployed in a cloud computing architecture but for which a redundancy solution has not been configured, or an application object, for which a redundancy solution that has been configured needs to be modified), and may also be an application object that has not been deployed.

In this step, if the redundancy solution configuration request received in step S401 only includes identification information of the application object to be configured (may be information such as a name), redundancy capability information and redundancy constraint requirement information of an application object that matches the identification information need to be further searched out, according to the identification information, from application object information that has been stored; if the redundancy solution configuration request received in step S401 includes the redundancy capability information and the redundancy constraint requirement information of the application object to be configured, the redundancy capability information and the redundancy constraint requirement information of the application object may be directly parsed from the redundancy solution configuration request.

S403. Determine, according to infrastructure information, infrastructure manager information, and application object information in an established redundancy capability information base, and the redundancy capability information and the redundancy constraint requirement information of the application object to be configured, a redundancy solution for the application object to be configured.

In this step, the infrastructure information may include redundancy capability information and/or resource usage information of at least one infrastructure, where the resource usage information herein includes remaining available redundancy resources of an infrastructure and/or between infrastructures, for example, storage resources, CPU resources, and network resources. The infrastructure manager information includes redundancy capability information of at least one infrastructure manager, where the infrastructure manager herein may manage infrastructures in multiple DCs, and a single DC may also include multiple infrastructure managers. The application object information includes redundancy capability information, and/or redundancy constraint information, and/or health status information (that is, one or more of the redundancy capability information, the redundancy constraint information, and the health status information) of at least one application object (which may be one application object, or a network service NS supported by multiple application objects, or a DC including multiple application objects) that has been deployed, where the health status information herein refers to information such as whether the application object that has been deployed is faulty and current load state.

In this embodiment of the present invention, a redundancy capability information base is established to collect information of each infrastructure, information of each infrastructure manager, and information of each application object that has been deployed; after a redundancy solution configuration request is received, an infrastructure, an infrastructure manager, and an application object that has been deployed (which may be used for redundancy in a load sharing mode) that support a redundancy capability and a redundancy constraint requirement of an application object to be configured are searched out from the established redundancy information base, and a final redundancy solution is determined. For example, a redundancy mode and a redundancy mechanism that need to be used may be first determined according to the redundancy capability information and the redundancy constraint requirement information of the application object to be configured; from infrastructures, infrastructure managers, data center DCs, and application objects that support the determined redundancy mode and the determined redundancy mechanism, an optimal infrastructure, an optimal infrastructure manager, and an optimal data center DC are selected based on principles such as richest current idle resources, compatibility, and anti-compatibility, and an optimal application object used in a load sharing redundancy mode is selected based on principles such as anti-compatibility and least application load. A finally determined redundancy solution may include information of one or more of the following elements: a redundancy mode, a redundancy mechanism, a data center DC, an infrastructure and an infrastructure manager, an application object that has been deployed, and the like.

It has been described in the foregoing procedure that the cloud computing architecture in this embodiment of the present invention may be an NFV architecture base on ICT. The following focuses on implementation in the cloud computing architecture.

Figure 5:
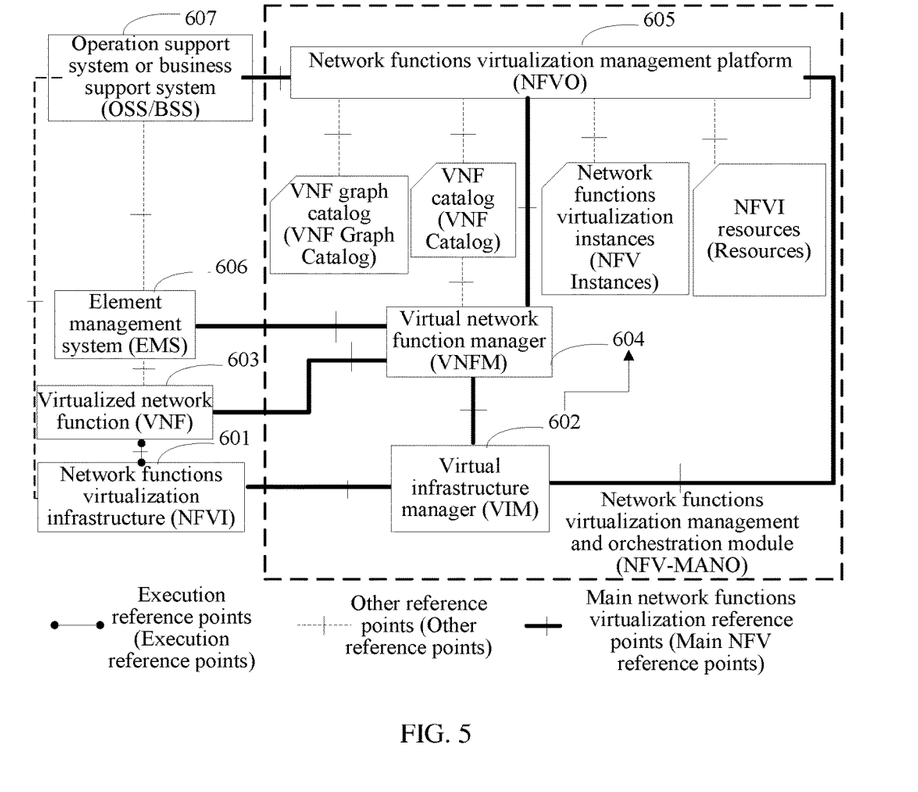
FIG. 5 is a schematic diagram of a MANO interface architecture in an NFV architecture.

A management and orchestration (MANO) module coordinating whole cloud system resources is defined in an NFV standard architecture, and FIG. 5 shows a schematic diagram of a MANO interface architecture in an NFV architecture. Function objects, such as a network functions virtualization infrastructure (NFV Infrastructure, NFVI) 601, a virtual infrastructure manager (VIM) 602, a virtualized network function (VNF) 603, a virtualized network function manager (VNF Manager, VNFM) 604, a network functions virtualization Orchestrator (NFVO) 605, an element management system (EMS) 606, and an operation support system/business support system (OSS/BSS) 607, are defined in the NFV architecture. The NFVI is used to provide a cloud infrastructure; the VNF is a cloud network element application; the VIM is responsible for infrastructure management; the VNFM is responsible for life cycle management of the VNF; the NFVO is responsible for life cycle management of a service; the EMS is a management system for a network element application; and the OSS/BSS is a network management system of a cloud system.

The NFV architecture is a fully open cloud standard architecture, and each component or a same type of components may be provided by different device vendors; redundancy may be implemented based on different layers (an infrastructure layer, an application layer, or a management layer); redundancy capabilities provided by different infrastructures or different VNFs may be different. Therefore, a redundancy solution may be selected in a more flexible manner for implementation of redundancy deployment in the NFV architecture.

It has been described in the foregoing procedure that, the execution subject in this embodiment of the present invention may be deployed as a redundancy solution preference module in a function entity of an existing cloud computing architecture, and specifically, may be deployed in an NFVO, or a VNFM, or an OSS/BSS, or an EMS in the NFV architecture.

A position where the redundancy solution preference module is deployed determines a transfer path of infrastructure information, infrastructure manager information, application object information, and the like. The following describes deployment of the redundancy solution preference module in an NFVO or a VNFM.

In the following implementation process, the redundancy solution preference module in the NFVO may actively query the foregoing infrastructure information, infrastructure manager information, and application object information from a VIM, a VNFM, or the like, and may also receive infrastructure information, infrastructure manager information, and application object information that are actively sent by the VIM, the VNFM, or the like, which is not limited herein. Likewise, the redundancy solution preference module in the VNFM may actively query the foregoing infrastructure information, infrastructure manager information, and application object information from a VIM, a VNF, or the like, and may also receive infrastructure information, infrastructure manager information, and application object information that are actively sent by the VIM, the VNF, or the like, which is not limited herein.

Figure 6:
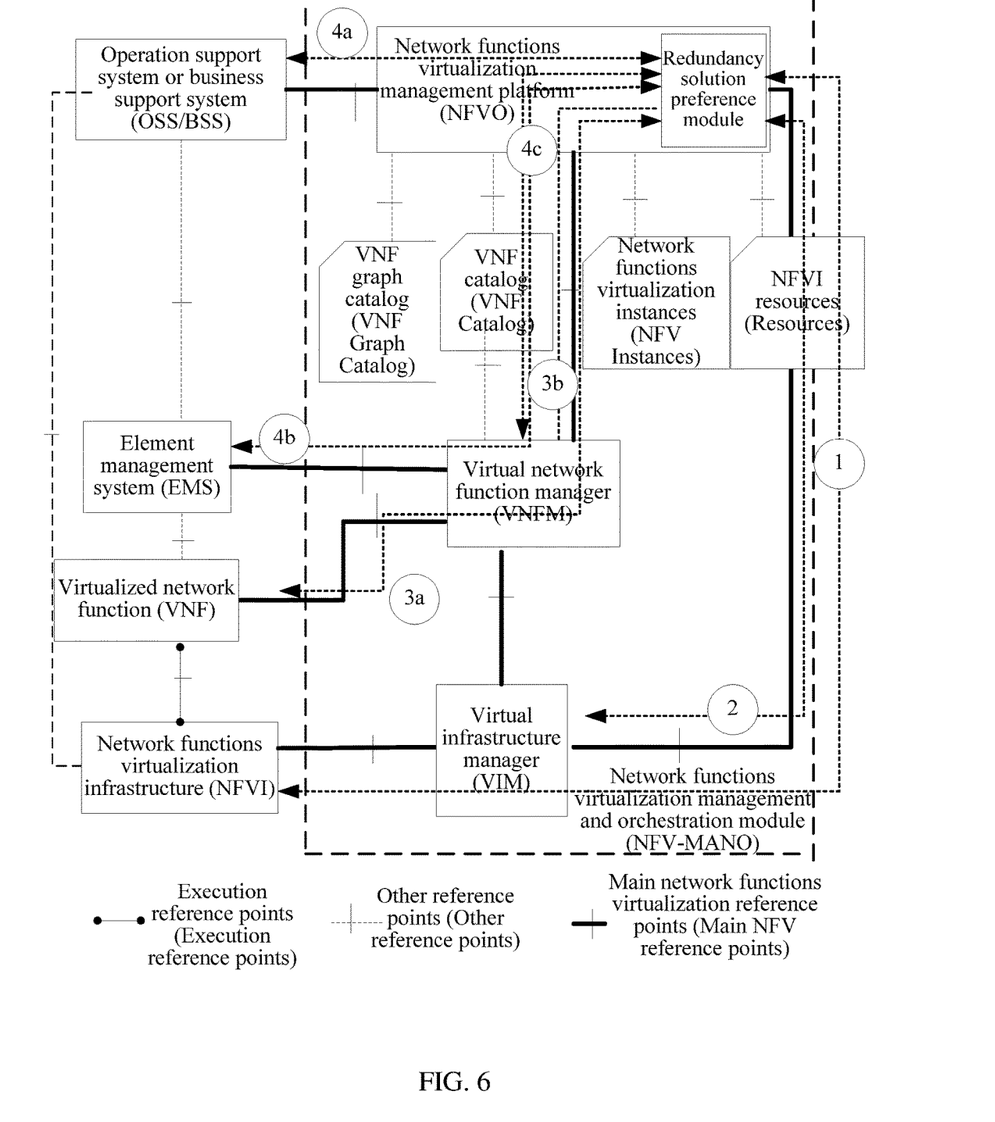
FIG. 6 is a schematic diagram of deployment of a redundancy solution preference module in an NFVO.

FIG. 6 shows a schematic diagram of deployment of a redundancy solution preference module in an NFVO. When the redundancy solution preference module is deployed in the NFVO, an NFVI transmits infrastructure information to the NFVO by using a VIM, as indicated by a path numbered 1 in FIG. 6, that is, the VIM reports relevant information of each managed NFVI to the NFVO, or the NFVO may subscribe to relevant information of an NFVI from the VIM; the VIM transmits infrastructure manager information to the NFVO, as indicated by a path numbered 2 in FIG. 6; a VNF transmits application object information (including information such as a redundancy capability, a redundancy constraint, and health status of an application object) to the NFVO by using a VNFM, as indicated by a path numbered 3a in FIG. 6, or the VNFM may directly transmit stored application object information to the NFVO, as indicated by a path numbered 3b in FIG. 6; an OSS/BSS transmits a redundancy solution configuration request (including redundancy constraint information of a user) to the NFVO, as indicated by a path numbered 4a in FIG. 6, or an EMS transmits a redundancy solution configuration request to the NFVO by using the VNFM, as indicated by a path numbered 4b in FIG. 6, or the VNFM transmits a redundancy solution configuration request to the NFVO, as indicated by a path numbered 4c in FIG. 6, or the NFVO may also directly receive a redundancy solution configuration request triggered by a user by using management software of the NFVO; specifically, a manner of transmitting a redundancy solution configuration request may be adding redundancy solution configuration request information in a virtual network function descriptor (VNFD) file or a network service descriptor (NSD) file, and in addition, the foregoing redundancy solution configuration request may also be transmitted by using an interface command.

Specifically, information or an element related to configuration of a redundancy solution may be defined in the VNFD or the NSD, where the information or the element is used to identify that a redundancy solution needs to be configured for a specified application object, or NS, or DC, and description content related to the information or the element is used to describe redundancy configuration information (including redundancy capability information, and/or redundancy constraint information, and/or the like) of a specified VNF, or NS, or DC.

For example, as shown in the following Table 1 and Table 2, a redundancy configuration indicator (Disaster Recovery Configuration Indicator, DRCI) may be defined in an VNFD, and description content of the DRCI is used to describe redundancy configuration information of a corresponding VNF, where the redundancy configuration information includes redundancy capability information, redundancy constraint information, and the like. A base number of the DRCI is used to indicate the number of pieces of the redundancy configuration information, and as shown in Table 1, the base number is 0-N, which indicates that redundancy configuration information may not be carried, or multiple pieces of redundancy configuration information may be carried; as shown in Table 2, the base number is 1, which indicates that one piece of redundancy configuration information is carried.

TABLE 1

| Name | Base Number | Description |
| --- | --- | --- |
| DRCI | 0-N | The DRCI is used to identify redundancy configuration information of a VNF, including a redundancy capability, a redundancy constraint, and the like; a base number 0-N indicates that redundancy configuration information may not be carried, or multiple pieces of redundancy configuration information may be carried. |

TABLE 2

| Name | Base Number | Description |
| --- | --- | --- |
| DRCI | 1 | The DRCI is used to identify redundancy configuration information of a VNF, including a redundancy capability, a redundancy constraint, and the like; a base number 1 indicates that one piece of redundancy configuration information is carried. |

Figure 7:
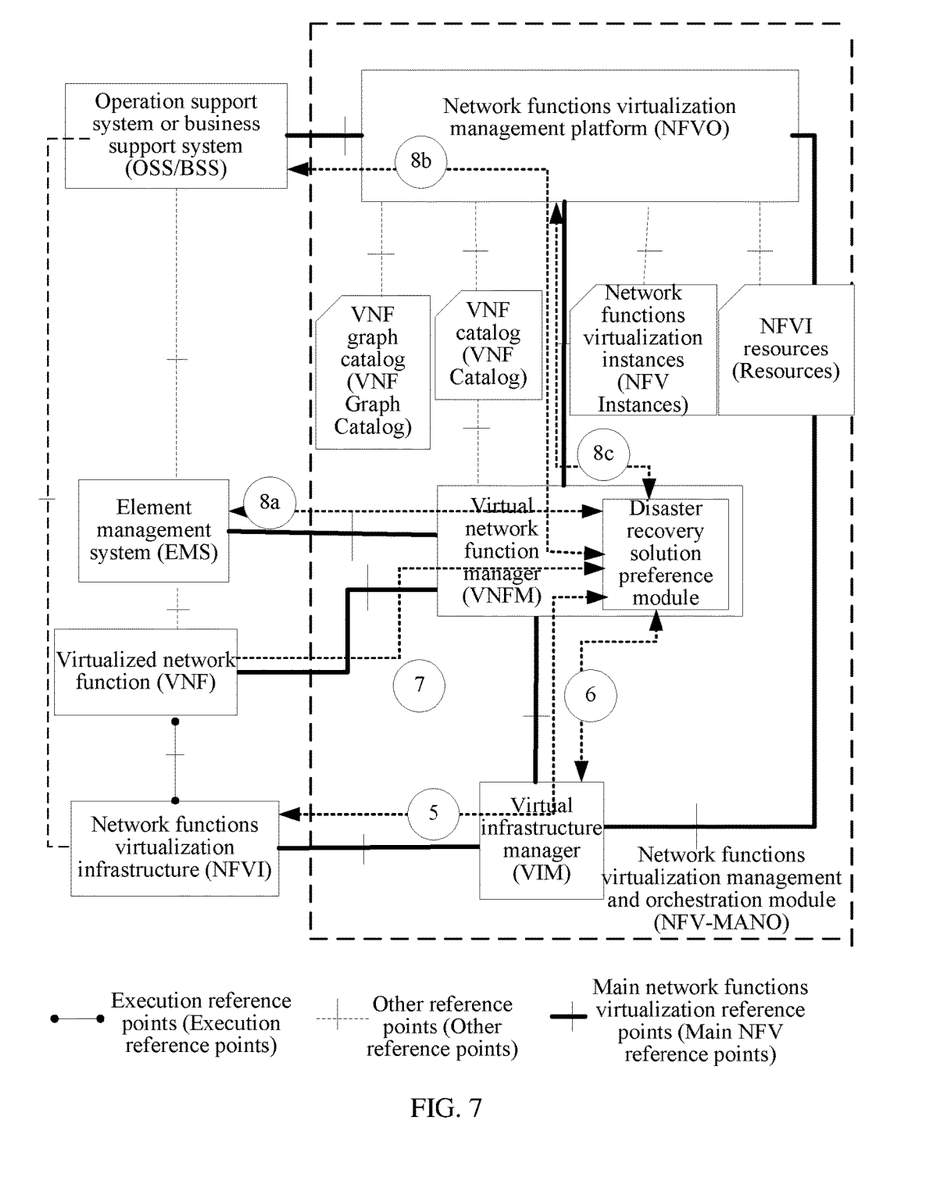
FIG. 7 is a schematic diagram of deployment of a redundancy solution preference module in a VNFM.

FIG. 7 shows a schematic diagram of deployment of a redundancy solution preference module in a VNFM. When the redundancy solution preference module is deployed in the VNFM, an NFVI transmits infrastructure information to the VNFM by using a VIM, as indicated by a path numbered 5 in FIG. 7, that is, the VIM transmits relevant information of each managed NFVI to the VNFM, or the VNFM may subscribe to relevant information of an NFVI from the VIM; the VIM transmits infrastructure manager information to the VNFM, as indicated by a path numbered 6 in FIG. 7; a VNF transmits application object information to the VNFM, as indicated by a path numbered 7 in FIG. 7; an EMS transmits a redundancy solution configuration request to the VNFM, as indicated by a path numbered 8a in FIG. 7, or an OSS/BSS transmits a received redundancy solution configuration request to an NFVO, and the NFVO forwards the redundancy solution configuration request to the VNFM, as indicated by a path numbered 8b in FIG. 7, or the NFVO transmits a received redundancy solution configuration request to the VNFM, as indicated by a path numbered 8c in FIG. 7; or the VNFM may also directly receive a redundancy solution configuration request triggered by a user by using management software of the VNFM. Specifically, a manner of transmitting a redundancy solution configuration request may be adding redundancy solution configuration request information in a virtual network function descriptor (VNFD) file or a network service descriptor (NSD) file, and the foregoing redundancy solution configuration request may also be transmitted by using an interface command.

It can be seen that in the foregoing two information transfer paths, no matter whether the redundancy solution preference module is deployed in the NFVO or the VNFM, the infrastructure information and the infrastructure manager information are transmitted to the redundancy solution preference module by using an infrastructure manager.

That is, the infrastructure information and the infrastructure manager information are collected into the established redundancy capability information base according to the following steps: receiving information, transmitted by any infrastructure manager, of the infrastructure manager and each infrastructure managed by the infrastructure manager; and storing, in the redundancy capability information base, the received information of the infrastructure manager and each infrastructure managed by the infrastructure manager.

Optionally, if the redundancy solution preference module and the redundancy capability information base are deployed in the NFVO, the receiving a redundancy solution configuration request includes: receiving the redundancy solution configuration request transmitted by an operation support system OSS or a business support system BSS, or receiving the redundancy solution configuration request that is from an element management system EMS and forwarded by the virtualized network function manager VNFM, or receiving the redundancy solution configuration request sent by the virtualized network function manager VNFM, or receiving the redundancy solution configuration request delivered by NFVO management software; and the application object information is collected into the established redundancy capability information base according to the following steps: receiving information, transmitted by the virtualized network function manager VNFM, of each application object managed by the VNFM; and storing the received information of each application object in the redundancy capability information base.

Optionally, if the redundancy solution preference module and the redundancy capability information base are deployed in the VNFM, the receiving a redundancy solution configuration request includes: receiving the redundancy solution configuration request transmitted by an element management system EMS, or receiving the redundancy solution configuration request that is from an OSS/BSS and forwarded by the NFVO, or receiving the redundancy solution configuration request transmitted by the NFVO, or receiving the redundancy solution configuration request delivered by VNFM management software; and the application object information is collected into the established redundancy capability information base according to the following steps: receiving application object information transmitted by each application object; and storing the received application object information in the redundancy capability information base.

In a specific implementation process, when any one of the infrastructure information, the infrastructure manager information, and the application object information changes, updated information may be transmitted to the redundancy capability information base in time by using the foregoing paths, and the redundancy solution preference module reformulates a proper redundancy solution for an affected application object according to the updated information. Specifically, based on the information transfer paths provided by the foregoing embodiments of the present invention, when information, such as a redundancy capability, of the infrastructure and the infrastructure manager changes, for example, software is upgraded, a new infrastructure component is added, or some infrastructures become faulty, the redundancy capability information base can update data in time and identify an affected application object, and then feed back the information to the redundancy solution preference module; and the redundancy solution preference module reformulates a proper redundancy solution for the affected application object, and reminds a user to adjust or triggers a system to automatically adjust the redundancy solution. When information, such as a redundancy capability or a redundancy constraint, of an application object that has been deployed changes, for example, software is upgraded, or a user performs an adjustment, the redundancy capability information base can also update data in time and identify an affected application object, and then feed back the information to the redundancy solution preference module; and the redundancy solution preference module reformulates a proper redundancy solution for the affected application object, and reminds the user to adjust or triggers a system to automatically adjust the redundancy solution.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention in detail. The descriptions of the foregoing embodiments are merely intended to help understand the method and core ideas of the present invention, and should not be understood as a limitation on the present invention. Any variation or replacement readily figured out by a person skilled in the art within the technical scope disclosed in the present invention shall fall within the protection scope of the present invention.

What is claimed is:

1. An apparatus for configuring a redundancy solution in a cloud computing architecture, the apparatus comprising:
    a memory storing an executable instruction; and
    a processor communicatively coupled with the memory to access and execute the executable instruction to perform a method comprising:
        receiving a redundancy solution configuration request for configuration of an application object to be deployed in the cloud computing architecture, wherein the cloud computing architecture comprises a network functions virtualization (NFV) architecture;
        determining, according to the redundancy solution configuration request, redundancy capability information and redundancy constraint requirement information of the application object to be configured;
        determining, according to infrastructure information of the cloud computing architecture, infrastructure manager information of an infrastructure manager of the cloud computing architecture, application object information in an established redundancy capability information base for the cloud computing architecture, and the redundancy capability information and the redundancy constraint requirement information of the application object to be configured, a redundancy solution for the application object, wherein
            the infrastructure information comprises at least one of redundancy capability information and resource usage information of at least one infrastructure, wherein the at least one infrastructure comprises a network functions virtualization infrastructure (NFVI),
            the infrastructure manager information comprises redundancy capability information of at least one infrastructure manager, and wherein the infrastructure manager is a virtual infrastructure manager (VIM), and
            the application object information comprises at least one of redundancy capability information, redundancy constraint information, and health status information of at least one application object that has been deployed, and wherein the application object comprises a virtualized network function (VNF); and
        configuring one or more of the cloud computing architecture and the application object based on the determined redundancy solution when the application object is deployed in the cloud computing architecture.

2. The apparatus according to claim 1, wherein the redundancy capability information base is located in a network functions virtualization orchestrator (NFVO) or located in a virtualized network function manager (VNFM); and
    wherein the processor is configured to collect the infrastructure information and the infrastructure manager information into the established redundancy capability information base by:
        receiving information, transmitted by any infrastructure manager, of the infrastructure manager and each infrastructure managed by the infrastructure manager, and
        storing, in the redundancy capability information base, the received information of the infrastructure manager and each infrastructure managed by the infrastructure manager.

3. The apparatus according to claim 2, wherein the redundancy capability information base is located in the NFVO;
    wherein the processor is configured to receive the redundancy solution configuration request by:
        receiving the redundancy solution configuration request transmitted by an operation support system (OSS) or a business support system (BSS),
        receiving the redundancy solution configuration request from an element management system (EMS) and forwarded by the VNFM,
        receiving the redundancy solution configuration request sent by the VNFM, or
        receiving the redundancy solution configuration request delivered by NFVO management software; and
    where the processor is further configured to collect application object information into the established redundancy capability information base by:
        receiving information, transmitted by the VNFM, of each application object managed by the VNFM, and
        storing the received information of each application object in the redundancy capability information base.

4. The apparatus according to claim 2, wherein the redundancy capability information base is located in the VNFM;
    wherein the processor is configured to receive the redundancy solution configuration request by:
        receiving the redundancy solution configuration request transmitted by an element management system (EMS),
        receiving the redundancy solution configuration request from an operation support system (OSS) or a business support system (BSS) and forwarded by the NFVO,
        receiving the redundancy solution configuration request transmitted by the NFVO,
        receiving the redundancy solution configuration request delivered by VNFM management software; and wherein the processor is further configured to collect the established redundancy capability information base by:
receiving application object information transmitted by each application object, and
storing the received application object information in the redundancy capability information base.

5. A method for configuring a redundancy solution in a cloud computing architecture, wherein the method comprises:
receiving a redundancy solution configuration request for configuration of an application object to be deployed in the cloud computing architecture, wherein the cloud computing architecture comprises a network functions virtualization (NFV) architecture;
determining, according to the redundancy solution configuration request, redundancy capability information and redundancy constraint requirement information of the application object to be configured;
determining, according to infrastructure information of the cloud computing architecture, infrastructure manager information of an infrastructure manager of the cloud computing architecture, application object information in an established redundancy capability information base for the cloud computing architecture, and the redundancy capability information and the redundancy constraint requirement information of the application object to be configured, a redundancy solution for the application object, wherein
the infrastructure information comprises at least one of redundancy capability information and resource usage information of at least one infrastructure, wherein the at least one infrastructure comprises a network functions virtualization infrastructure (NFVI),
the infrastructure manager information comprises redundancy capability information of at least one infrastructure manager, and wherein the infrastructure manager is a virtual infrastructure manager (VIM), and
the application object information comprises at least one of redundancy capability information, redundancy constraint information, and health status information of at least one application object that has been deployed, and wherein the application object comprises a virtualized network function (VNF); and
configuring one or more of the cloud computing architecture and the application object based on the determined redundancy solution when the application object is deployed in the cloud computing architecture.

6. The method according to claim 5, wherein the redundancy capability information base is located in a network functions virtualization orchestrator (NFVO) or located in a virtualized network function manager (VNFM); and
wherein the method further comprises collecting the infrastructure information and the infrastructure manager information into the established redundancy capability information base by:
receiving information, transmitted by any infrastructure manager, of the infrastructure manager and each infrastructure managed by the infrastructure manager, and
storing, in the redundancy capability information base, the received information of the infrastructure manager and each infrastructure managed by the infrastructure manager.

7. The method according to claim 6, wherein the redundancy capability information base is located in the NFVO;
wherein receiving the redundancy solution configuration request further comprises:
receiving the redundancy solution configuration request transmitted by an operation support system (OSS) or a business support system (BSS),
receiving the redundancy solution configuration request that is from an element management system (EMS) and forwarded by the VNFM,
receiving the redundancy solution configuration request sent by the VNFM, or
receiving the redundancy solution configuration request delivered by NFVO management software; and
wherein collecting the application object information into the established redundancy capability information base further comprises:
receiving information, transmitted by the VNFM, of each application object managed by the VNFM, and
storing the received information of each application object in the redundancy capability information base.

8. The method according to claim 6, wherein the redundancy capability information base is located in the VNFM;
wherein receiving the redundancy solution configuration request comprises:
receiving the redundancy solution configuration request transmitted by an element management system (EMS),
receiving the redundancy solution configuration request that is from an operation support system (OSS) or a business support system (BSS) and forwarded by the NFVO,
receiving the redundancy solution configuration request transmitted by the NFVO, or
receiving the redundancy solution configuration request delivered by VNFM management software; and
wherein collecting the application object information into the established redundancy capability information base further comprises:
receiving application object information transmitted by each application object, and
storing the received application object information in the redundancy capability information base.

9. A non-transitory computer-readable medium, storing computer instructions for configuring a redundancy solution in a cloud computing architecture, that when executed by one or more processors, cause the one or more processors to perform the steps of:
receiving a redundancy solution configuration request for configuration of an application object to be deployed in the cloud computing architecture, wherein the cloud computing architecture comprises a network functions virtualization (NFV) architecture;
determining, according to the redundancy solution configuration request, redundancy capability information and redundancy constraint requirement information of the application object to be configured;
determining, according to infrastructure information of the cloud computing architecture, infrastructure manager information of an infrastructure manager of the cloud computing architecture, application object information in an established redundancy capability information base for the cloud computing architecture, and the redundancy capability information and the redundancy constraint requirement information of the application object to be configured, a redundancy solution for the application object, wherein the infrastructure information comprises at least one of redundancy capability information and resource usage information of at least one infrastructure, wherein the at least one infrastructure comprises a network functions virtualization infrastructure (NFVI), the infrastructure manager information comprises redundancy capability information of at least one infrastructure manager, and wherein the infrastructure manager is a virtual infrastructure manager (VIM), and the application object information comprises at least one of redundancy capability information, redundancy constraint information, and health status information of at least one application object that has been deployed, and wherein the application object comprises a virtualized network function (VNF); and configuring one or more of the cloud computing architecture and the application object based on the determined redundancy solution when the application object is deployed in the cloud computing architecture.

10. The non-transitory computer-readable medium according to claim 9, wherein the redundancy capability information base is located in a network functions virtualization orchestrator (NFVO) or located in a virtualized network function manager (VNFM); and wherein the steps further comprises collecting the infrastructure information and the infrastructure manager information into the established redundancy capability information base by:

receiving information, transmitted by any infrastructure manager, of the infrastructure manager and each infrastructure managed by the infrastructure manager, and storing, in the redundancy capability information base, the received information of the infrastructure manager and each infrastructure managed by the infrastructure manager.

11. The non-transitory computer-readable medium according to claim 10, wherein the redundancy capability information base is located in the NFVO;

wherein the step of receiving the redundancy solution configuration request further comprises:

receiving the redundancy solution configuration request transmitted by an operation support system (OSS) or a business support system (BSS), receiving the redundancy solution configuration request that is from an element management system (EMS) and forwarded by the VNFM, receiving the redundancy solution configuration request sent by the VNFM, or receiving the redundancy solution configuration request delivered by NFVO management software; and wherein the step of collecting the application object information into the established redundancy capability information base further comprises steps for:

receiving information, transmitted by the VNFM, of each application object managed by the VNFM, and storing the received information of each application object in the redundancy capability information base.

12. The non-transitory computer-readable medium according to claim 10, wherein the redundancy capability information base is located in the VNFM;

wherein the step of receiving the redundancy solution configuration request comprises:

receiving the redundancy solution configuration request transmitted by an element management system (EMS), receiving the redundancy solution configuration request that is from an operation support system (OSS) or a business support system (BSS) and forwarded by the NFVO, receiving the redundancy solution configuration request transmitted by the NFVO, or receiving the redundancy solution configuration request delivered by VNFM management software; and wherein collecting the application object information into the established redundancy capability information base according comprises steps for:

receiving application object information transmitted by each application object, and storing the received application object information in the redundancy capability information base.

* * * * *